(12) United States Patent
Cress et al.

(10) Patent No.: US 11,374,882 B2
(45) Date of Patent: Jun. 28, 2022

(54) INTELLIGENT CHAT CHANNEL PROCESSOR

(71) Applicant: International Business Machines Corporation, Armonk, NY (US)

(72) Inventors: Shane Nicholas Cress, Wendouree (AU); Pranab Agarwal, Oxenford (AU); Ilse M. Breedvelt-Schouten, Manotick (CA)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 17/075,986

(22) Filed: Oct. 21, 2020

(65) Prior Publication Data

US 2022/0124056 A1 Apr. 21, 2022

(51) Int. Cl.
*H04L 51/02* (2022.01)
*G06F 40/284* (2020.01)
(Continued)

(52) U.S. Cl.
CPC ............ *H04L 51/02* (2013.01); *G06F 40/284* (2020.01); *G06F 40/289* (2020.01);
(Continued)

(58) Field of Classification Search
CPC ..... H04L 51/02; G06F 40/284; G06F 40/289; G06K 9/6215; G06K 9/6262; G06N 3/04
See application file for complete search history.

(56) References Cited

U.S. PATENT DOCUMENTS

| 7,631,182 B1 | 12/2009 | Droux et al. |
| 8,769,417 B1 | 7/2014 | Robinson et al. |

(Continued)

FOREIGN PATENT DOCUMENTS

| CN | 110445707 A | 11/2019 |
| WO | 20180860401 W | 5/2018 |
| WO | 20191607911 W | 8/2019 |

OTHER PUBLICATIONS

Feng et al., "An Intelligent Discussion-Bot for Answering Student Queries in Threaded Discussions," IUI '06: Proceedings of the 11th International Conference on Intelligent User Interfaces, Jan.-Feb. 2006, 7 pgs, ACM.

(Continued)

*Primary Examiner* — Shirley X Zhang
(74) *Attorney, Agent, or Firm* — Mark Bergner

(57) ABSTRACT

A computer-implemented system and method for a chat system is provided for processing chat channel communications. The method comprises receiving a user message from a user, and classifying the user message using a classifier into a classified input that is one of a question, an answer, and a statement. When the input is a question, the method comprises determining a set of relevant answers from an answer database that are related to the question. The method determines a relatedness score reflecting a degree of relatedness between each related answer of the set of related answers and the question. A top answer is determined from the set of related answers based on the relatedness scores, and the method presents at least one of the top answer and the set of related answers to the user. When the input is an answer, the method stores the answer in the answer database.

20 Claims, 11 Drawing Sheets

(51) Int. Cl.
G06K 9/62 (2022.01)
G06F 40/289 (2020.01)
G06N 3/04 (2006.01)

(52) U.S. Cl.
CPC ......... *G06K 9/6215* (2013.01); *G06K 9/6262* (2013.01); *G06N 3/04* (2013.01)

(56) References Cited

U.S. PATENT DOCUMENTS

| | | | |
|---|---|---|---|
| 8,972,428 | B2 | 3/2015 | Dicker et al. |
| 11,201,843 | B1* | 12/2021 | Agarwal ............... H04L 51/12 |
| 2011/0246910 | A1 | 10/2011 | Moxley et al. |
| 2017/0063744 | A1 | 3/2017 | Banerjee |
| 2018/0020094 | A1 | 1/2018 | Marrelli |
| 2018/0020097 | A1 | 1/2018 | Marrelli |
| 2019/0019077 | A1 | 1/2019 | Griffin et al. |
| 2019/0207876 | A1* | 7/2019 | Terry ..................... H04L 51/02 |
| 2019/0260694 | A1* | 8/2019 | Londhe .................. G06N 5/04 |
| 2020/0177529 | A1* | 6/2020 | Trim ....................... H04L 51/10 |

OTHER PUBLICATIONS

Bhatnagar, T., "Development and Applications of Self-learning Smart Conversational Bots," International Journal for Research in Applied Science & Engineering Technology (IJRASET), vol. 6, Issue III, Mar. 2018, pp. 882-886.

Chali et al., "A reinforcement learning formulation to the complex question answering problem," Information Processing & Management, 2015, vol. 51, No. 3, pp. 252-272. (Author-deposited version) DOI :10.1016/j.ipm.2015.01.002.

Sheldon, M., "The smartest member of my team is a Slack bot (or, how to build an AI powered assistant," Bloomsbury AI, Jan. 15, 2018, 7 pages. https://medium.com/bloomsbury-ai/the-smartest-member-of-my-team-is-a-slack-bot-or-how-to-build-an-ai-powered-assistant-192bd0d75814.

Haughey, M., "How to collaborate in sizable channels," slack Blog, Sep. 26, 2018, 9 pages. https://slackhq.com/how-to-collaborate-in-sizable-channels.

Kostadinov, S., "How does the [current] best question answering model work?", Towards Data Science, Dec. 26, 2017, 7 pages. https://towardsdatascience.com/how-the-current-best-question-answering-model-works-8bbacf375e2a.

Maheshwari, A., "Report on Text Classification using CNN, RNN & HAN," Medium Jatana, Jul. 17, 2018, 13 pages. https://medium.com/jatana/report-on-text-classification-using-cnn-rnn-han-f0e887214d5f.

Cui et al., "Attention-over-Attention Neural Networks for Reading Comprehension," arXiv: 1607.04423v4, Jun. 6, 2017, 10 pages.

Mell, P. et al., "The NIST Definition of Cloud Computing", Recommendations of the National Institute of Standards and Technology, NIST Special Publication 800-145, 7 pages, Sep. 2011.

GB Search and Examination Report dated Apr. 4, 2022 from GB Application No. GB2114076.9 filed Oct. 1, 2021.

* cited by examiner

_US 11,374,882 B2_

INTELLIGENT CHAT CHANNEL PROCESSOR

BACKGROUND

Disclosed herein is a system and related method for answering questions in high-traffic and multiple time zone chat forums.

In large discussion forums, or "channels" within a chat application for a specific purpose, many people may enter the forum at different times and from different time zones. The participants entering the channel for the first time often do not know the history of the channel, and may be unwilling or unable to browse back in time to all the topics discussed, particularly in channels having high traffic and/or with extensive historical information. Such a situation may become overwhelming for new or returning participants. For example, if there are fifteen or more questions asked in the last two months, it may be difficult for the new or returning participant to figure out which questions have been already asked, and what the best answers to such questions are. Discussed herein is an intelligent chat channel processor.

SUMMARY

According to one aspect disclosed herein, a computer-implemented method is provided for processing chat channel communications in a chat application. The method comprises using a processor for various operations, including receiving a user message from a user, and classifying the user message using a classifier into a classified input that is one of a question, an answer, and a statement. Responsive to the classified input being a question, the method comprises determining a set of relevant answers from an answer database that are related to the question. The method determines a relatedness score reflecting a degree of relatedness between each related answer of the set of related answers and the question. Additionally, the method comprises determining a top answer from the set of related answers based on the relatedness scores, and presenting at least one of the top answer and the set of related answers to the user. Responsive to the classified input being an answer, the method stores the answer in the answer database. Responsive to the classified input being a statement, the method discards the classified input. The method further comprises receiving a feedback user message that rates the top answer, and modifies a reward score for the top answer based on the feedback user message to adjust a future top answer response.

According to another aspect disclosed herein, a chat channel processing system is provided comprising a processor configured to receive a user message from a user and classify the user message using a classifier into a classified input that is one of a question, an answer, and a statement. Responsive to the classified input being a question, the system determines a set of relevant answers from an answer database that are related to the question, determines a relatedness score reflecting a degree of relatedness between each related answer of the set of related answers and the question, and determines a top answer from the set of related answers based on the relatedness scores. The system presents at least one of the top answer and the set of related answers to the user. Responsive to the classified input being an answer, the system stores the answer in the answer database. Responsive to the classified input being a statement, the system discards the classified input. The system further receives a feedback user message that rates the top answer, and modifies a reward score for the top answer based on the feedback user message to adjust a future top answer response.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Overview of Chat System

Figure 1:
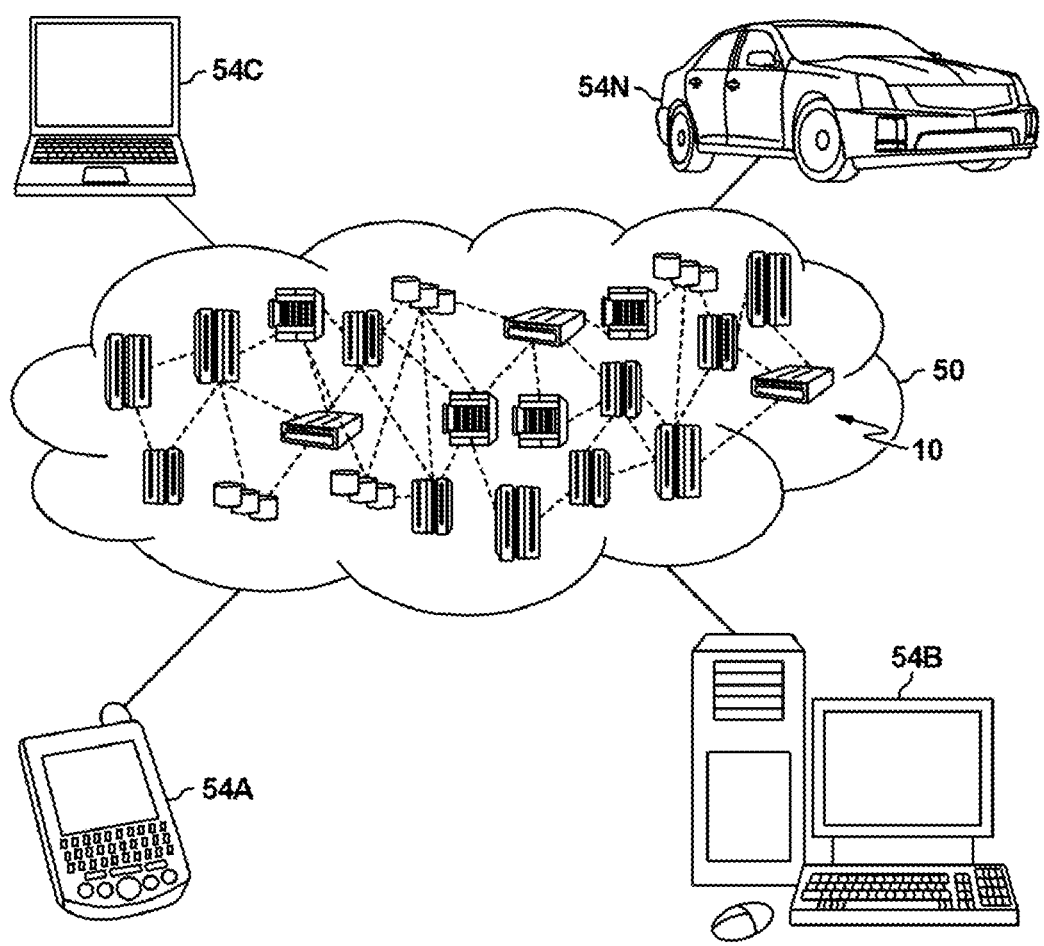
FIG. 1 depicts a cloud computing environment according to an embodiment of the present invention.

An intelligent chat channel processor (ICCP) may be provided as a component of or associated with a computer-based chat system. When a user is using a chat service, a user message triggers the ICCP to perform a classification of the user's message text to determine whether it is a question. If the user's message is a question, the ICCP matches the user's question to previously gathered answer(s) and context data in order to match the question to relevant answer(s) based on historical user feedback on the suitability of the answers to the given question.

Answer gathering is achieved by using the question classification method to recognize text which is not a question, and automatically determines whether the text has a high relevancy to previously recognized questions, allowing it to then save the answers scoring a high relevancy which can then be used the next time a question is asked related to that answer. To collect answer data, the ICCP monitors other user's message text posted to the channel. When the other user's message text is classified as an answer to a question, the ICCP stores that other user's answer data in an answer database for future consumption. The ICCP may also regulate answer data by removing data that has become obsolete, to a certain extent, and remains largely unreferenced, therefore making such answer data likely useless.

The answer(s) provided by the ICCP to a question posed by the chat user may be provided as a chat "thread" to the question, with a confidence level and indication of the original "responders" who provided answers in the past. When an answer is given by the ICCP to a question, users can then "vote" on whether the given answer was good or bad in context to the question it was answering, providing the system with the means to choose more highly rated answers in the future and avoid badly rated answers all in the context of the question given.

By providing a "voting" mechanism in the chat, the ICCP can learn which response is most liked and changes the "weight" for certain types of answers and original responders within this chat for future improvement of the ICCP.

Thus, the ICCP provides a chatroom user the ability to ask a question and the ICCP finds the most likely answers to similar questions in the same chatroom, placing one or more answers from within the same chat channel as a separate thread in the chat that may be used to further train the ICCP. The system may do this by pro-actively gathering context-specific answers to similar questions in the same chat channel and providing a set of answers the user can vote for to further improve future answers.

According to some embodiments, the ICCP may therefore: provide "contextual relevant" answers to questions, learn question/answer pairs within the right context, and/or learn which chat users can be trusted more as giving the "right answers" to certain types of questions, provide a "thread" of answers so that disturbing the overall chat flow is not disturbed. Thus, there is no need to manually provide question/answer examples to the machine learning system, and there is no need to provide direct input queries to the machine for specific questions.

These features of the ICCP may be provided by a combination of systems, components, and/or agents to provide an autonomous question answering system that can discern a user's message as being a question, an answer, or a statement without supervision or manual input. The ICCP may automatically identify answers to questions, and provides learned answers to identified questions by using a recursive neural network (RNN) and a term frequency (TF)-inverse document frequency (IDF) combination (TF-IDF) to actively identify and remember answers in a forum environment. It may also use the RNN, the TF-IDF and reinforcement learning (RL) to identify and answer questions in a forum environment. In some embodiments, the ICCP may learn the relevancy of an answer to a question based on user feedback, and make use of RL to actively learn from the user feedback to select better answers.

Various possible benefits may be realized, according to some embodiments, including: the ability to discern between a question, answer or statement without supervision or manual input, the ability to associate a statement as an answer to a previously asked question without manual input, use of an RNN and TF-IDF combination to actively identify and remember answers in a forum environment, use of RNN, TF-IDF and RL to identify and answer questions in a forum environment, the ability to autonomously learn question-answer pairs without any previous input or definition of question answer pairs, proactively learning and responding without input or prompt, pro-actively gathering context-specific answers to similar questions in the same chat channel and providing a set of answers the user can vote for to further improve future answers, automatic adjustment of best answer response through user feedback, and use of RL to actively learn from user feedback on selecting better answers.

According to some embodiments, the above combination of features may operate autonomously, with the only human interaction being the user asking a question looking for an answer—in some embodiments the user may give a rating to an answer.

The following acronyms may be used below:
API application program interface
ARM advanced RISC machine
CBOW Continuous Bag of Words
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
ICCP intelligent chat channel processor
IDF inverse document frequency
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
RL reinforcement learning
RNN recursive neural network
ROM read-only memory
SaaS software as a service
SAF sigmoid activation function
SLA service level agreement
SRAM static random-access memory
TF term frequency
WAN wide-area network Cloud Computing in General It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
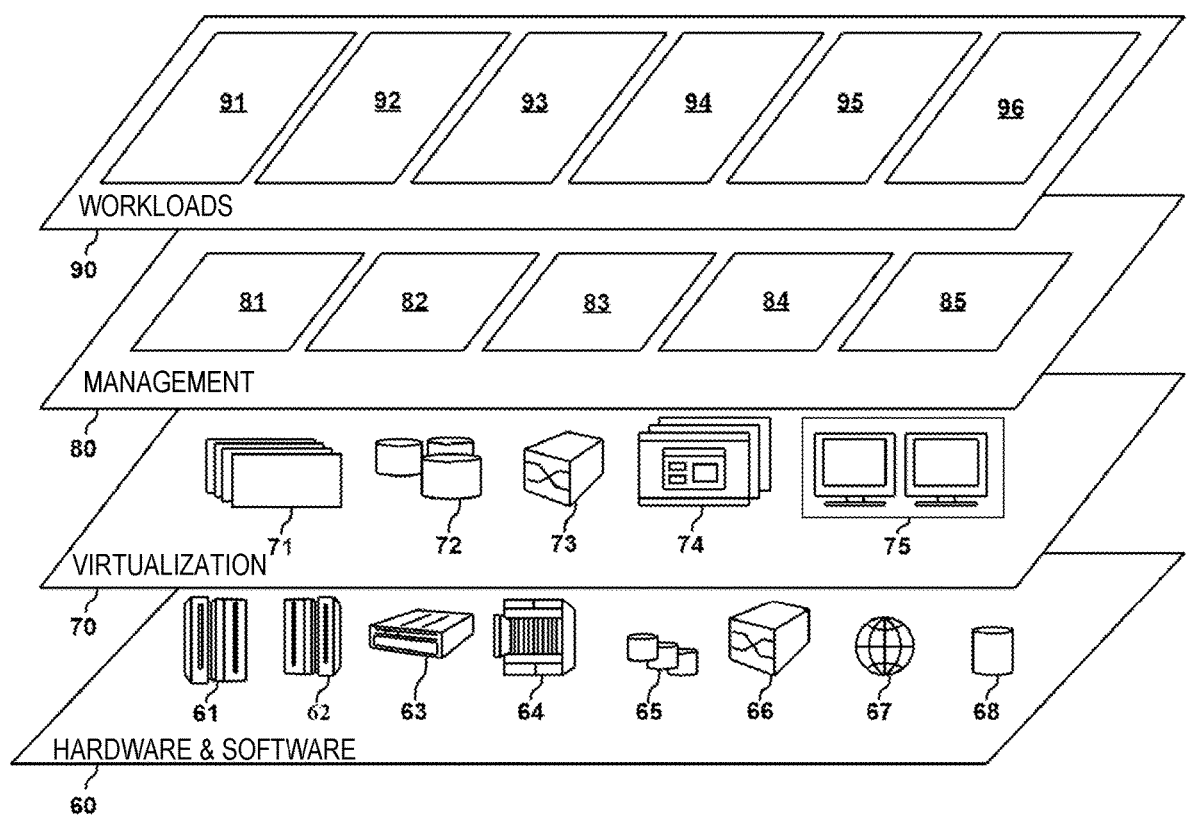
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System in General

Figure 3:
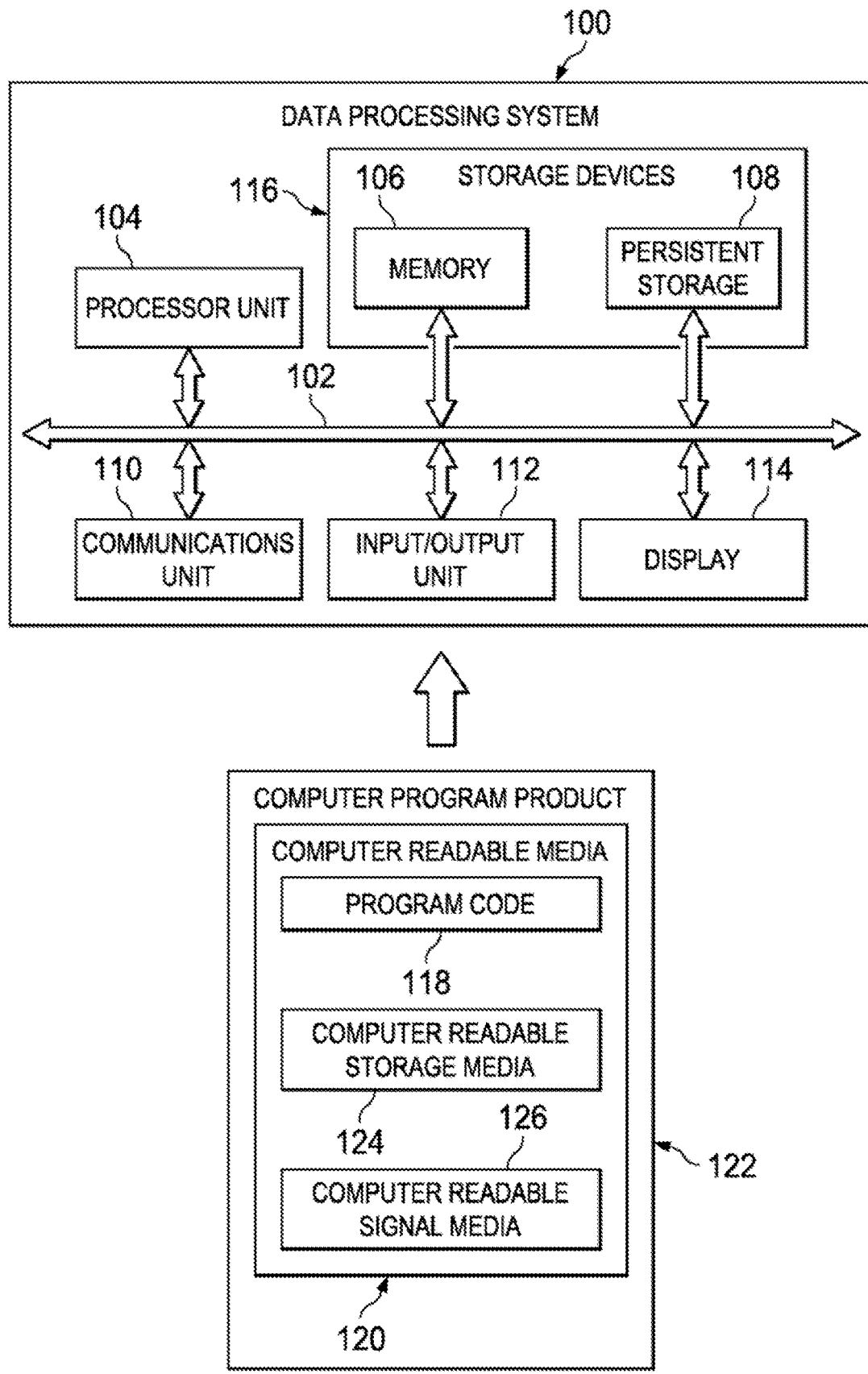
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100.

Intelligent Chat Channel Processor (ICCP)

System Overview

Figure 4:
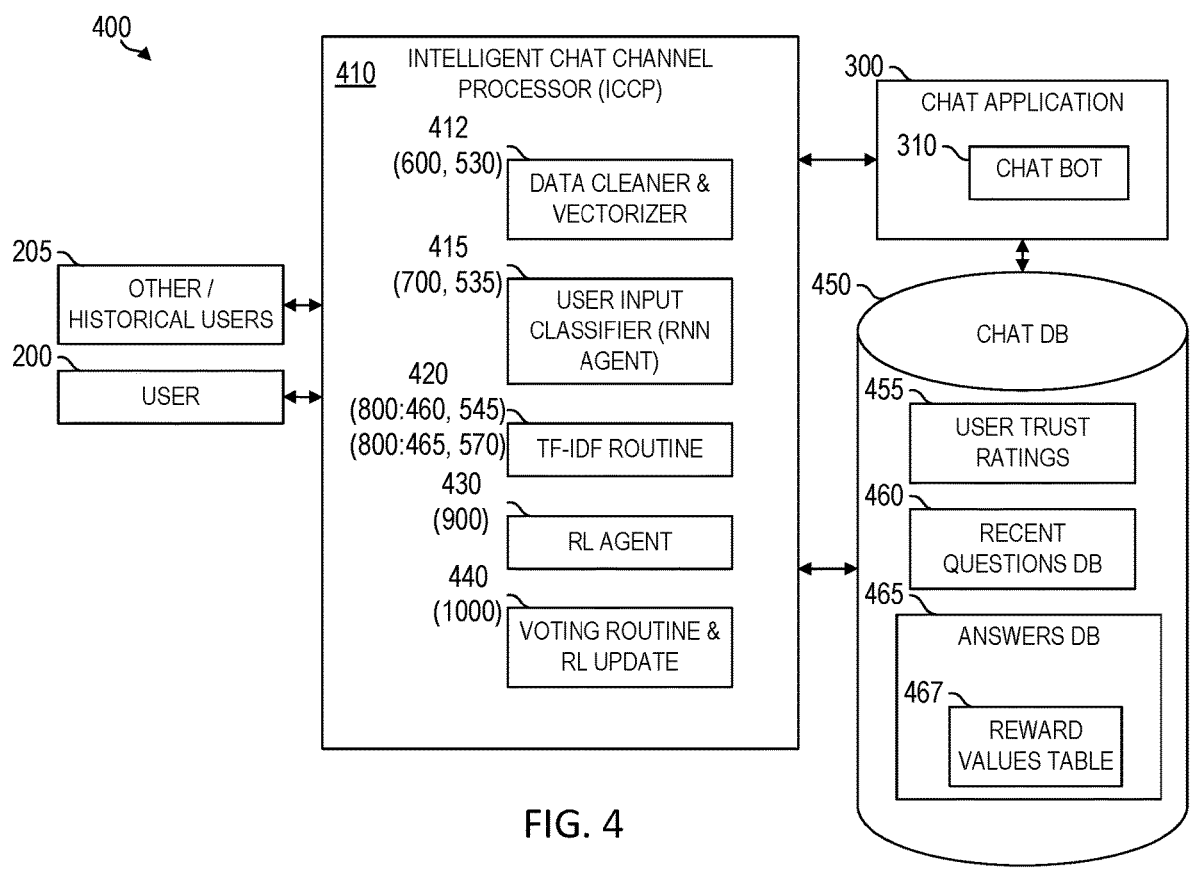
FIG. 4 is a block diagram of a chat system, according to some implementations.

FIG. 4 is a block diagram illustrating a group of interacting components 400, including an intelligent chat channel processor (ICCP) 410 that extends an existing chat application 300 having a chat bot 310 for a particular chat channel. The ICCP 410 may be implemented separately from, but communicate with, the chat application 300, or it may be formed as an integral part of the chat application 300. A user 200 and other and/or historical users 205 may interact with the chat application 300 as they have done in traditional systems. In some implementations, separate chat bots 310 may form a part of the chat application 300 and address different topics, issues, etc. The ICCP 410 may be implemented, e.g., on a DPS 100 and/or designed to operate in a cloud computing environment 50.

Figure 6:
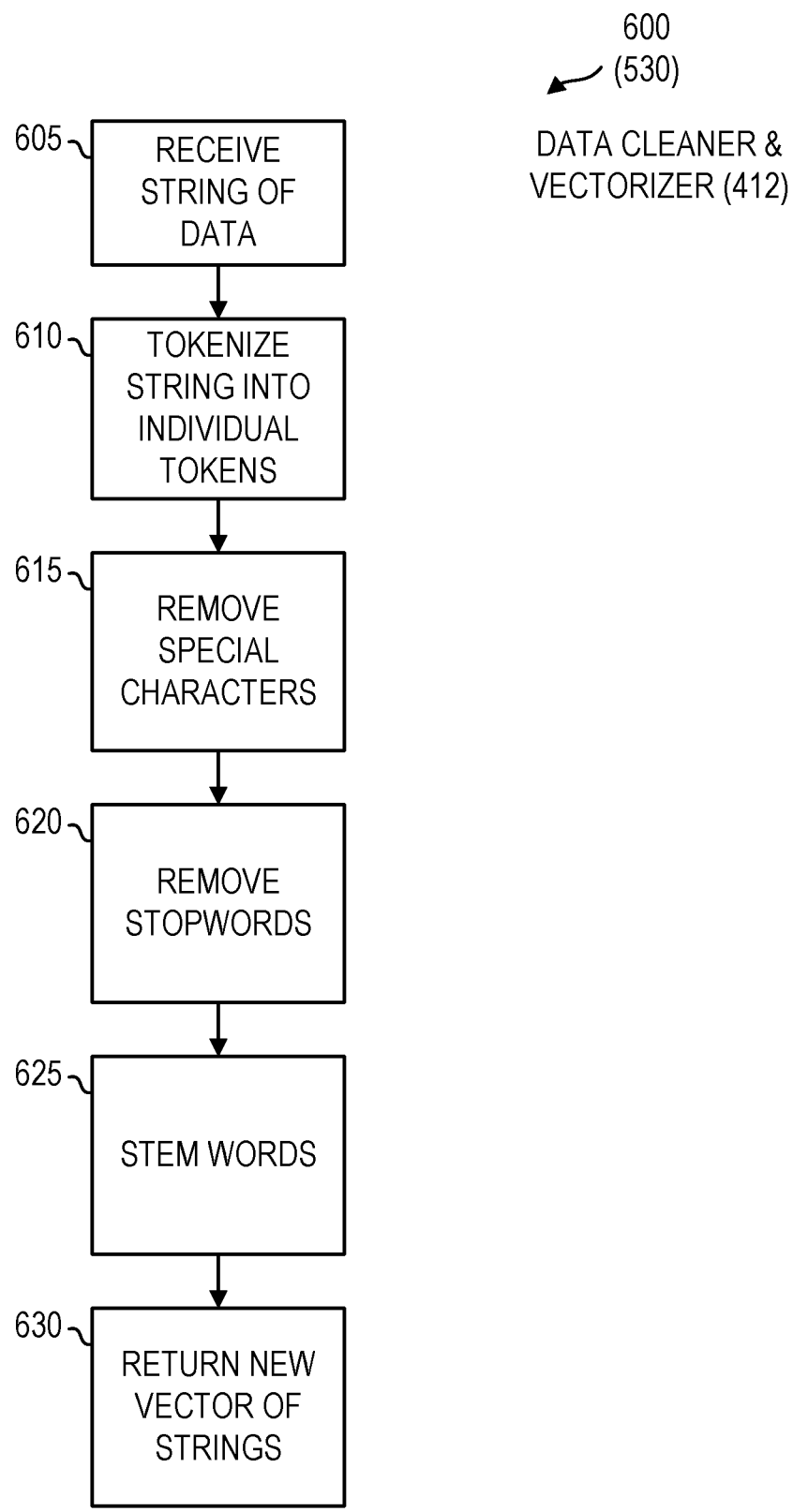
FIG. 6 is a flowchart of a process for cleaning and vectorizing data, according to some embodiments.
Figure 7:
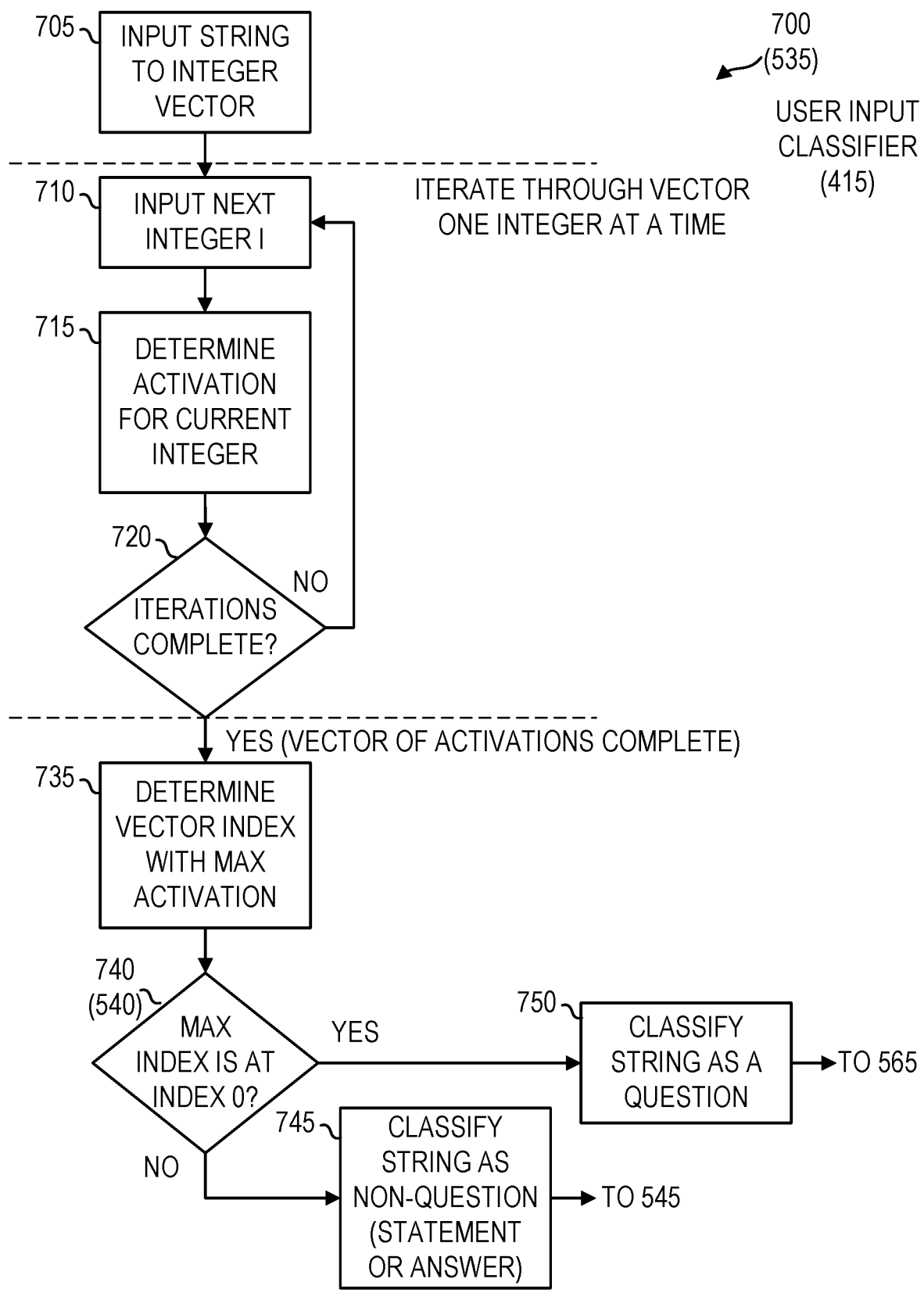
FIG. 7 is a flowchart of a process for classifying user input, according to some embodiments.

The ICCP 410 may comprise a data cleaner and vectorizer 412 that takes text input from the user 200 and other/historical users 205 and translates them into a vectorized message. A user input classifier 415, which may be in the form of an RNN agent, takes the vectorized message and classifies it as a question, answer, or statement. A statement may be in the form of an answer, but without any relevant question that it applies to. A TF-IDF routine 420 may be utilized to search for relevant/related questions and answers in respective databases. The RL agent 430 may be used to determine the best element(s) from a set of elements. A voting and RL update routine 440 may be used to receive answer rating input from users 200 and then update the RL agent 430. The chat application 300 and the ICCP 410 may utilize information associated with the chat database 450 which comprises user trust ratings 455, a recent questions database 460, and an answers database 465, which itself may comprise a reward values table 467 containing reward values associated with answers in the answers database 465. All or parts of the chat database 450 may be comprised within the chat application 300, the ICCP 410, or both. These components are best described below in terms of the processes/functions they perform as well as their interactions with one another and with entities outside of the ICCP 410. The data cleaner and vectorizer 412 may be associated with operation 530 (FIG. 5A) and process 600 (FIG. 6). The user input classifier (RNN agent) 415 may be associated with operation 535 (FIG. 5A) and process 700 (FIG. 7). The TF-IDF routine 420 may be associated with process 800 (FIG. 8) and two operations: 545 (FIG. 5B) when using the recent questions database 460, and 570 (FIG. 5B) when using the answers database 465. The RL agent 430 may be associated with the process 900 (FIG. 9), and the voting routine & RL update 440 may be associated with process 1000 (FIG. 10).

Process Overview

Figure 5A:
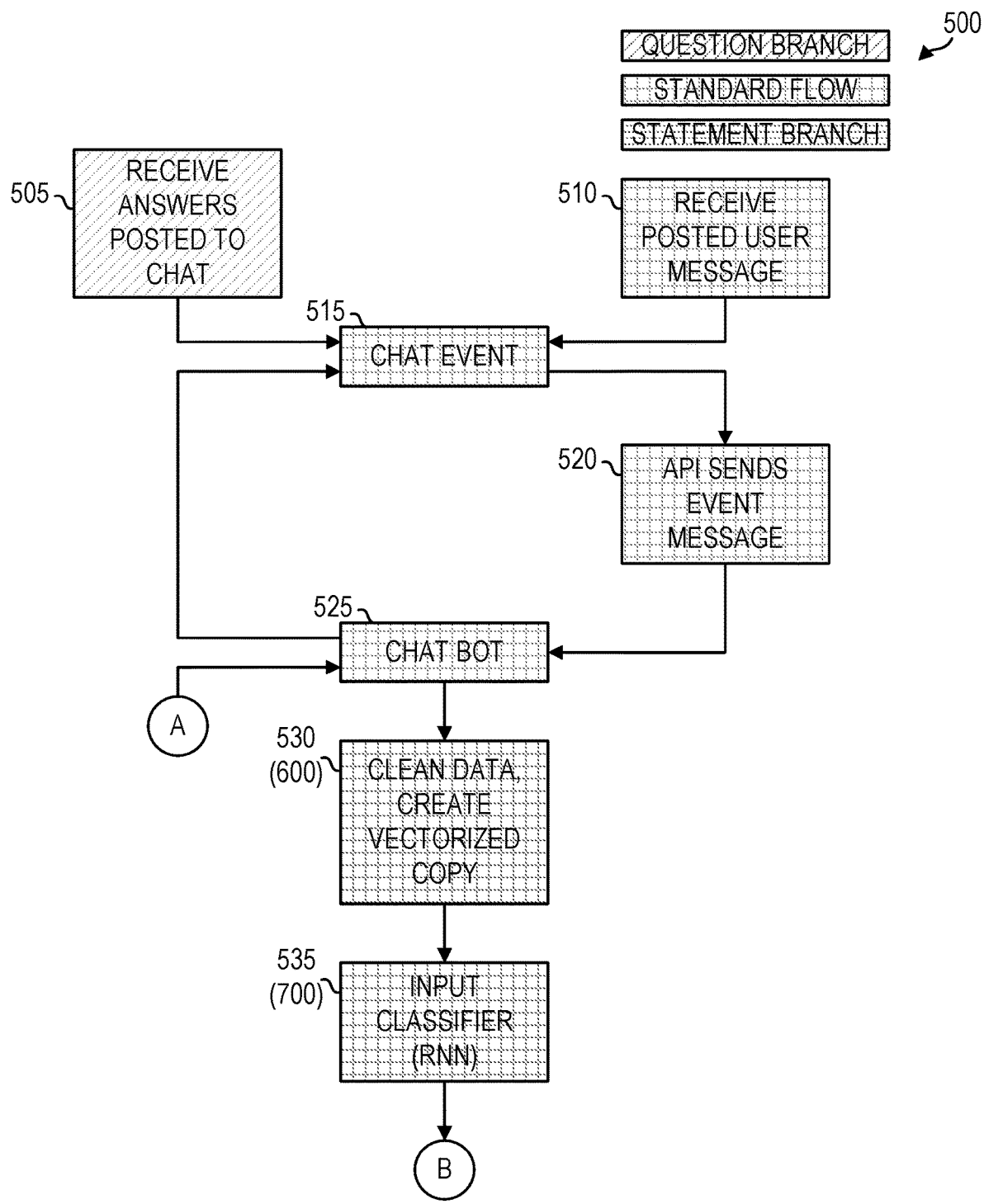
FIGS. 5A & 5B are parts of a flowchart of an overall process for operating an intelligent chat channel processor, according to some embodiments.
Figure 5B:
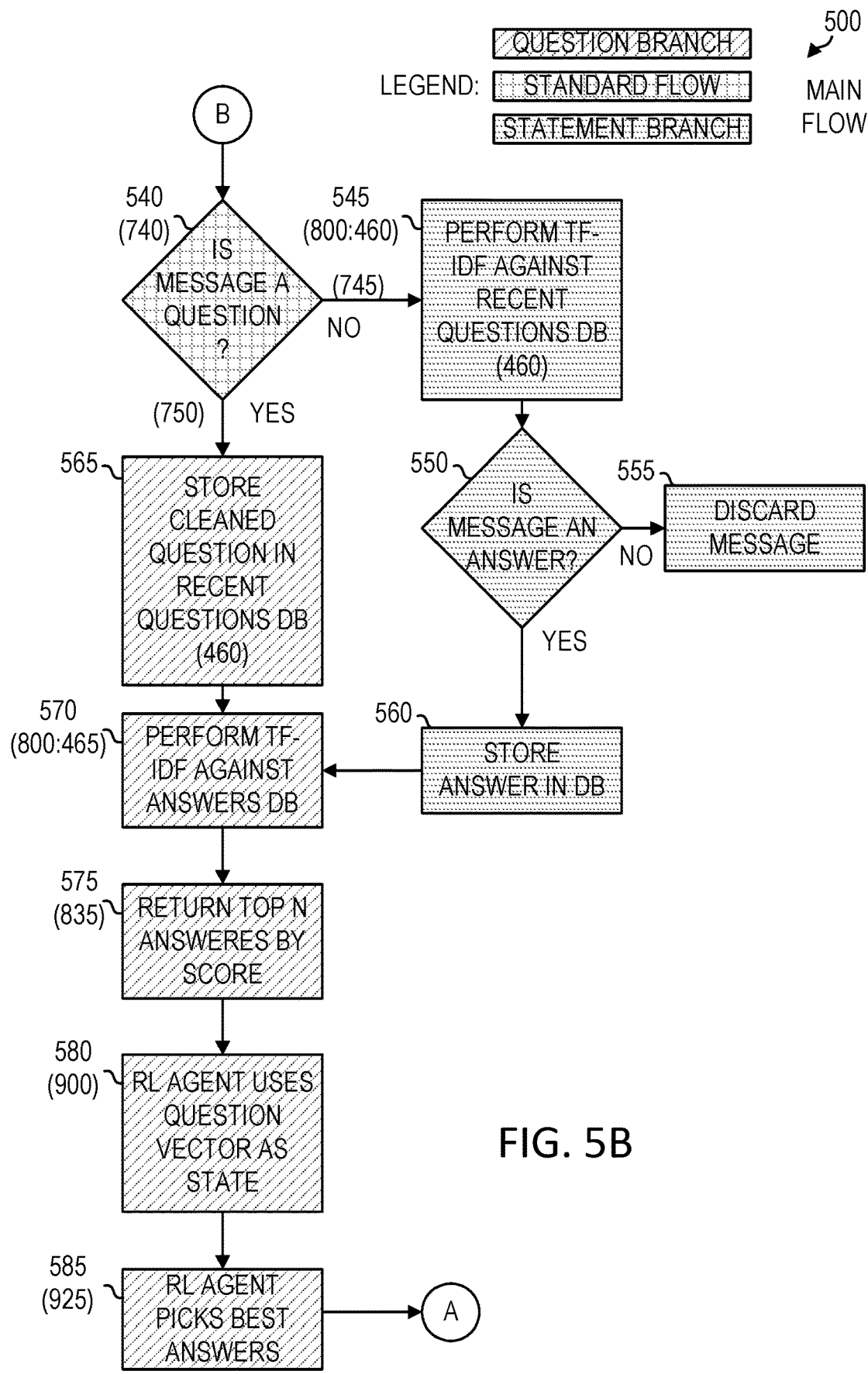

FIGS. 5A and 5B are parts of an overall process 500 that may be used according to some embodiments described herein. Operations of the process have been illustrated as being a part of the standard flow (these include operations 510-540, illustrated in crosshatch), part of the question branch (these include operations 505, and 565-585, illustrated in diagonal line shading), or part of the statement branch (these include operations 545-560, illustrated in horizontal line shading).

In operation 510, the ICCP 410 receives a user 200 message posted to the chat channel that is received as a chat event 515. The receipt of this message may trigger an application program interface (API) event that, in operation 520, sends an event message to any relevant chat bot 525 (310) of the chat application 300 currently subscribed to the API. The API event message may then be retrieved by the respective chat bots 310. In operation 530, the contents of the message are cleaned, and a vectorized copy of the message is created for further processing.

In operation 535, the ICCP 410 may, in some implementations, make use of a recursive neural network (RNN) agent as a user input classifier 415 in order to determine a type of the message (question, answer, or statement). An RNN is a type of deep neural network created by applying the same set of weights recursively over a structured input to produce a structured prediction over variable-size input structures, or a scalar prediction on it, by traversing a given structure in topological order. RNNs may be used to learn sequence and tree structures in natural language processing, mainly phrase and sentence continuous representations based on word embedding. In operation 540, if the classifier 415 determines that the message is not a question (i.e., a non-question message) (540:N), then, in operation 545, the ICCP 410 may perform a term frequency (TF)-inverse document frequency (IDF) (TF-IDF) determination of relevance. The TF-IDF process is explained in more detail below with reference to FIG. 8 and process 800. The relevance of the non-question message against a recent questions database 460 is performed in order to determine the relevance of the non-question message to the questions in the recent questions database 460. Although the ICCP 410 has determined that the user input is a non-question, it is still not known whether the user input constitutes an answer or not because the non-question may not be relevant to any of the questions in the recent questions database 460. Thus, the recent questions database 460 has the TF-IDF process 800 performed against the given string (non-question message) and returns TF-IDF scores of a set of relevant questions meeting a predefined threshold value (i.e., questions from the recent questions database 460 related to the non-question message).

In operation 550, the message may be determined not to be an answer (550:N) by the RNN agent 415. This determination may be made if the highest TF-IDF score for any of the questions in the recent questions database 460 does not meet some predefined question relevance threshold. In this case, in operation 555, the message is discarded as it is neither a question nor an answer to a recent question. Otherwise (550:Y), the non-question message has been determined be an answer since the highest TF-IDF score meets the predefined threshold of relevance. In this case, in operation 560, the answer may be stored in the answer database 465 for future retrieval when given a question, and processing continues at operation 570, described below.

If the message is a question (540:Y), then, in operation 565, the message is stored in the recent questions database 460. In operation 570, the TF-IDF process 800 is performed against the answer database 465, and, in operation 575, the top n (e.g., ten) answers that have the greatest match to the question are returned by their score from the TF-IDF process 800 as a set of relevant answers. A greatest match may be determined by a relatedness score (in this embodiment, the TF-IDF score) reflecting a degree of relatedness between each related answer of the set of related answers and the question. If the TF-IDF score for an answer in the answers database 465 is one of the "n" highest scores, then it may be considered an answer to the question. Any number of answers may be specified, e.g., by program parameters, user specification, and the like. In some embodiments, if the TF-IDF score passes some threshold value, then it may be considered an answer to one of the recent questions. The highest TF-IDF score may be considered when being performed against the answer database in operation 570, and the highest TF-IDF score may be considered the answer most related to the question. However, the highest TF-IDF score is not required when performed against the recent questions database 460 in operation 545, since the main significance is to obtain questions that breach the predefine threshold value.

In operation 580, these top n answers are passed to the RL agent 430 which executes the process 900 and uses the question vector as a state (i.e., the question for which the subsequent operations relate to), and in operation 585 (925), the RL agent 430 may pick the best answers from the top answers returned by score and according to previous user 200 feedback scores in relation to this question. The processing may return to the operation of the chat bot 525 upon receipt of another event message.

The question may be determined "in context", since different contexts for the same question may return different answers. By way of example, a question "what are the necessary documents" may have very different answers depending upon whether it is asked by a buyer in a real estate transaction vs. being asked by a real estate agent. Context determination may be made through use of the word embeddings, which may provide a vector giving a particular word a location in a multi-dimensional space, where words with similar meanings are located more closely to that word. These word embeddings may, for example, be initially created using one of two methods: the Continuous Bag of Words (CBOW) method, and the Skipgram method, where, for example, the CBOW model gives a neural network a sentence with one word missing; the neural network then predicts the missing word based on the context of the sentence. This, in combination with the TF-IDF, may be used to locate answers based on their similarity to the "highest value words" in the query. The RL agent which chooses the answer based off previous users' feedback helps to determine that context.

Data Cleaning and Vectorization

FIG. 6 is a flowchart of a process 600 (530), according to some embodiments, for operation of the data cleaner and vectorizer 412 for cleaning and vectorizing the received user message. In operation 605, the user message may be received as, e.g., a string of data that originated from the user 200. In operation 610, the string is tokenized into individual tokens. In some embodiments, each word may be taken out of the string and placed into an array, but any form of data organization for the tokens may be utilized. By way of an illustrative example, the string "who is running for president?" may be turned into an array or vector ["who", "is", "running", "for", "president?"])

In operation 615, special characters may be removed from the strings. From the previous example, the string "president?" may be turned into just "president". In operation 620, stop words may removed. Stop words are words which are filtered out before or after processing of natural language data (text). Stop words are the most commonly used words that provide little or no valuable information. From the previous example, "is" and "for" may be considered stop words that are removed, leaving the vector ["who", "run-ning", "president"]. Any group of words can be chosen as the stop words for a given purpose.

In operation 625, words may be stemmed to shorten the number of unique words that must be compared for easier computation. A word may have a single stem, namely the part of the word that is common to all its inflected variants. Thus, in this usage, all derivational affixes are part of the stem. For example, the stem of friendships is friendship, to which the inflectional suffix-s is attached. Stems may be a root, e.g. run, or they may be morphologically complex, as in compound words (e.g. the compound nouns meat ball or bottle opener) or words with derivational morphemes (e.g. the derived verbs black-en or standard-ize). Hence, the stem of the complex English noun photographer is photo•graph•er, but not photo. For another example, the root of the English verb form destabilized is stabil-, a form of stable that does not occur alone; the stem is de•stabil•ize, which includes the derivational affixes de- and -ize, but not the inflectional past tense suffix-(e)d. That is, a stem is that part of a word that inflectional affixes attach to. From the previous example, the word "running" is stemmed to "run", leaving the final cleaned data as the vector ["who", "run", "president"]. The actual data strings within the vector may be tokenized into integers, thereby creating a tokenized message vector that represents the user message. A copy of the cleaned data is vectorized into a numbered form, where each word is transformed to an integer representing that word. These vectors may be padded or truncated to a universal length. An integer may be used to create a word embedding of a uniform distribution of weights of a fixed length (e.g., a vector of length 32 with weights between −1 and 1) and input to the RNN.

By way of example, each word may be mapped to a unique integer, for instance, the word "run" may be mapped to the integer 42, so every time the word "run" appears in the sentence, it would be replaced by the number 42. A word embeddings matrix may then be used—which may be provided by an integer mapping routine in a library, such as Google's Word2Vec or Stanford University's GloVe. The integer 42 may then be used as a mapping to the $42^{nd}$ index of the word embedding matrix, where the word embedding for the word "run" is located. The word embedding may be a vector of a set length (e.g. 32) given by the integer mapping routine, which may then provide a vector of weights to use in the RNN 415. This vector is a simple set of values which represent the location of the word in a multi-dimensional space, allowing measurement of its closeness to other words, where the distance to another word in this multi-dimensional space is related to its similarity in the meaning to this other word. These weights may then be processed through a mathematical pipeline of the RNN 415, which outputs a set of probabilities between 0 and 1, etc. In operation 630, newly created vectors representing the strings are returned.

User Input Classifier (RNN)

FIG. 7 is a flowchart of a process 700 (535), according to some embodiments, of the operation of the user input classifier 415. In some embodiments, the classifier 415 is an RNN agent, as described above. The following operations are described in an embodiment in which the words have been tokenized into integers, and the user message has been cleaned and vectorized into an integer vector. However, other embodiments in which different representations of the message are utilized in the classification may be considered as well.

In operation 705, the classifier 415 receives the integer vector message and the process iterates through the integers that make up the vector message by looping between operations 710 through 720, incrementing 710 the integer index and propagating one integer at a time. When the iterations are not complete (operation 720:N), the process continues to loop and takes the next integer at operation 720. At each iteration, in operation 715, an activation is determined for the current word integer. Each vector is forward propagated in the RNN, being multiplied against a hidden layer of Long Short Term Memory (LSTM) cells. A "dropout" layer can be used to prevent overfitting of data.

By way of illustrative example, a given vector having a length of 32 is input to the RNN's input layer which will be fixed length. If we know the word embeddings will all be length 32, the input layer will also be a 32 length layer or a 32 "node" layer. The input layer will then connect via a set of weights to a hidden layer which may be, for example, a layer of 150 nodes. In this case, there will be 32×150 weights, where each weight has been initialized to a random value and adjusted by training. The 32 input values are then multiplied against the 32 weights connecting to the first node in the hidden layer, then to the second node, etc., and sum the resulting vectors at each hidden node to create 150 values, each of which are then squashed by an activation function, e.g., a Sigmoid function, to a value between 0 and 1, which represents an activation value or probability. This set of probabilities are then looped back to join the next set of input values from the next input vector, adding to the next round's hidden node outputs.

Once all vectors are processed, the final hidden node outputs connect to an output layer, in the present case, a layer of 2 nodes, which again will be connected via a set of weights resulting in 150×2 weights, repeating a similar process as that of the input to hidden layers, but only outputting two values which will be a set of probabilities between the values 0 and 1, which, when both summed together, will equal 1.

Overfitting occurs when the model is overfit specifically to the training data, resulting in less accuracy when given data it has not been provided to it previously. Dropout removes recurrent connections that do not carry important information. The output from the LSTM cells are fed back to the input of the next word embedding for the next word in the sequence creating a feedback loop. When the iterations are complete (operation 720:Y), i.e., all of the words in the vector message have been processed and there are no more words left in the sequence, the results (a vector of summations generated by the multiplication of a set of weights against the values generated by the hidden layer of the RNN) may be fed to a Sigmoid activation function which outputs a vector of two numbers both between 0 and 1. Using the example above, there are 150 nodes in the hidden layer, and two nodes in the output layer. The results of the 150 hidden layer nodes are multiplied against 150 weights connected to one of the outputs, and the results of the 150 hidden layer nodes are multiplied against the other 150 weights connected to the other output node, creating a pair of vectors which are then summed up to create two values. The values are normalized between 0 and 1 once the sigmoid activation function (SAF) is applied to these 2 values, giving the pair of probabilities for each output. The process proceeds to operation 735.

In operation 735, a determination is made of the vector index creating a maximum activation. This refers to the index of the two values which is the maximum value (index(max(output vector))). For example, given a vector index of [0.75, 0.25], this function provides the index of value 0.75 in the vector. In this example it will be index of 0 where, for example, element 0 might represent the activation value of Yes, and element 1 might represent the activation value of No. Hence if element 0 is greater than element 1, then the classification is Yes. In operation 740, if, by way of example, the maximum index is not at index 0 (740:N), then the vector message may, in operation 745, be classified as a non-question (statement or answer, resolved at operations 545, 550). Otherwise (740:Y), the vector message may, in operation 750, be classified as a question, and the process 700 proceeds to the process 900.

Term Frequency-Inverse DocumentFrequency (TF-IDF) Process

Figure 8:
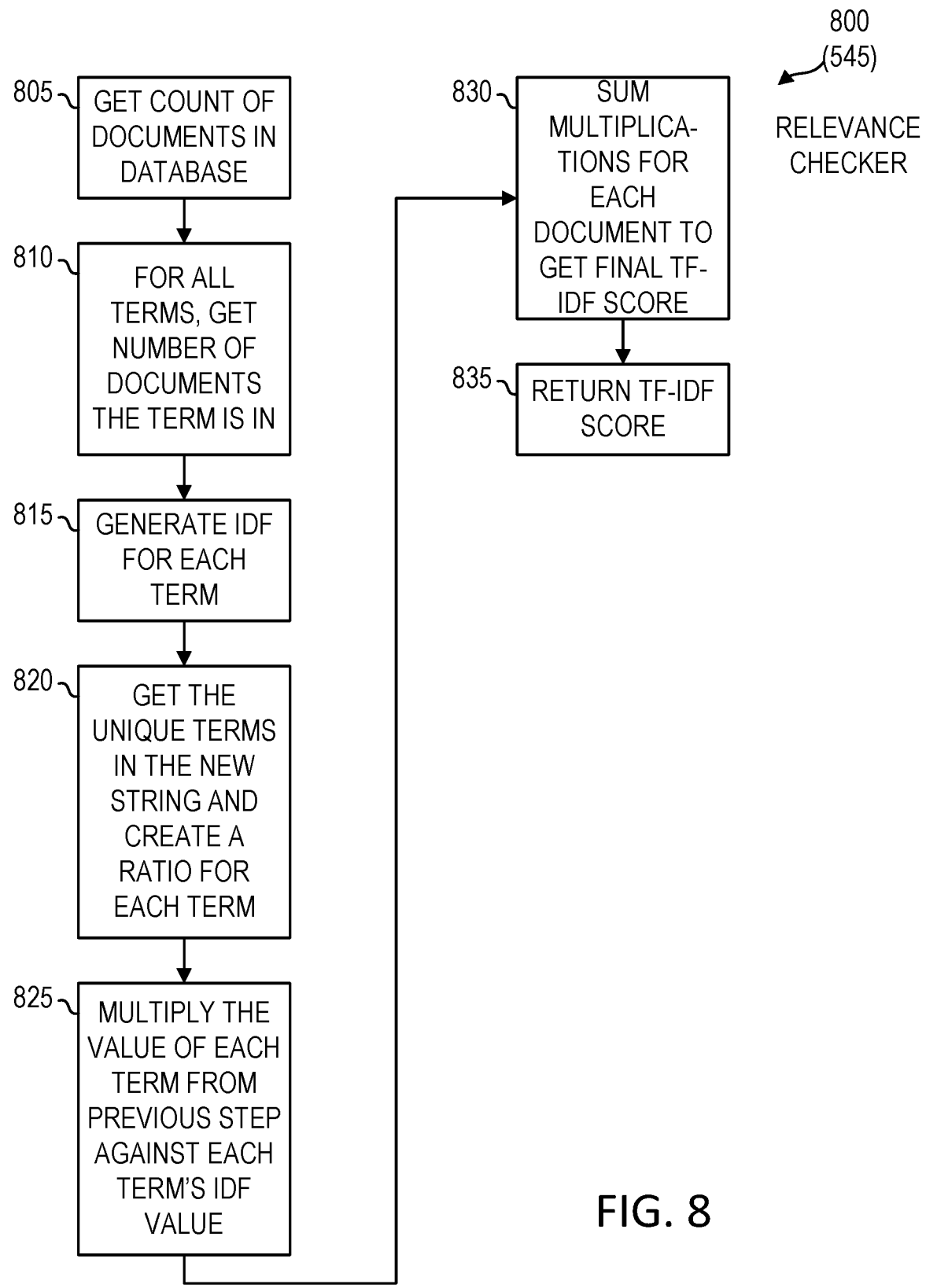
FIG. 8 is a flowchart of a process for performing term frequency-inverse document frequency analysis, according to come embodiments.

FIG. 8 is a flowchart of a TF-IDF process 800, according to some embodiments, that may be executed by the TF-IDF routine 420. This process may be utilized, e.g., in operation 545 above, against the recent questions list 460, and, in operation 570 above, against the answers database 465. The "documents" described with respect to FIG. 8 thus refer to these respective elements (questions in the recent questions database 460 for operation 545, and answers in the answer database 465 for operation 570) in a generic manner below.

The TF-IDF is a numerical statistic that reflects how important a word is to a document in a collection or corpus. It is often used as a weighting factor in searches of information retrieval, text mining, and user modeling. The TF-IDF value increases proportionally to the number of times a word appears in the document and is offset by the number of documents in the corpus that contain the word, which helps to adjust for the fact that some words appear more frequently in general. The TF-IDF weighting scheme may be used in scoring and ranking a document's relevance given a user query. The TF-IDF is the product of two statistics, term frequency and inverse document frequency.

In the case of the TF, the simplest choice is to use the raw count of a term in a document, i.e., the number of times that term occurs in the document, although other known variants may be used. By way of example, given a set of English text documents and a desire to rank which document is most relevant to the query, "the brown cow", a simple way to start out is by eliminating documents that do not contain all three words "the", "brown", and "cow", but this still leaves many documents. To further distinguish them, we might count the number of times each term occurs in each document; the number of times a term occurs in a document is called its term frequency. However, in the case where the length of documents varies greatly, adjustments may be made. One form of term weighting may be summarized as: the weight of a term that occurs in a document is simply proportional to the term frequency.

The IDF is a measure of how much information the word provides, i.e., if it is common or rare across all documents. It is the logarithmically scaled inverse fraction of the documents that contain the word (obtained by dividing the total number of documents by the number of documents containing the term, and then taking the logarithm of that quotient). By way of example, because the term "the" is so common, term frequency will tend to incorrectly emphasize documents which happen to use the word "the" more frequently, without giving enough weight to the more meaningful terms "brown" and "cow". The term "the" is not a good keyword to distinguish relevant and non-relevant documents and terms, unlike the less-common words "brown" and "cow". Hence an inverse document frequency factor is incorporated which diminishes the weight of terms that occur very frequently in the document set and increases the weight of terms that occur rarely. The specificity of a term can be quantified as an inverse function of the number of documents in which it occurs.

The TF-IDF is then calculated as the product of the TF and the IDF. A high weight in the TF-IDF is reached by a high term frequency (in the given document) and a low document frequency of the term in the whole collection of documents; the weights hence tend to filter out common terms. Since the ratio inside the IDF's log function is always greater than or equal to 1, the value of IDF (and TF-IDF) is greater than or equal to 0. As a term appears in more documents, the ratio inside the logarithm approaches 1, bringing the IDF and TF-IDF closer to 0.

In operation 805, the ICCP 410 may retrieve the total number of documents in the database (either the recent questions list 460 or the answers database 465). In operation 810, for all terms/words, the ICCP 410 gets the number of documents this term/word is present within (e.g., if there are fifty documents, and this term is present in twenty-five).

In operation 815, the ICCP 410 generates an IDF value for this term, where the IDF value for a term can be calculated by taking the total document count, and dividing it by the number of documents the term appears in, and taking the natural logarithm of the result. To avoid division by 0, 1 can be added to both sides.

In operation 820, using the input string, find the Term Frequency (TF) value for each term, where the TF is the number of times this term appears in the string divided by the number of unique terms in the string (e.g., given the string "The current Queen is Queen Elizabeth", which, after cleaning in process 600, becomes "current Queen Queen Elizabeth", the TF value for "Queen" is ⅔ since there are three unique terms, and "Queen" occurs twice).

In operation 825, the TF values from the string are multiplied with the IDF values in each document to generate a TF-IDF score (for example, using the previous string where the TF for "Queen" is 0.66, the TF values of this string are multiplied with a document's IDF values, where the document may contain the terms "current" and "Queen" but not "Elizabeth", resulting in TF(current)=0.33 multiplied by the IDF(current), the TF(Queen)=0.66 multiplied by the IDF(Queen), and the TF(Elizabeth)=0.33 multiplied by 0 since the term Elizabeth is not in this document. In operation 830, these calculations are summed for the TF-IDF score for this document, and this score, in operation 835, is returned.

Reinforcement Learning (RL) Agent Process

Figure 9:
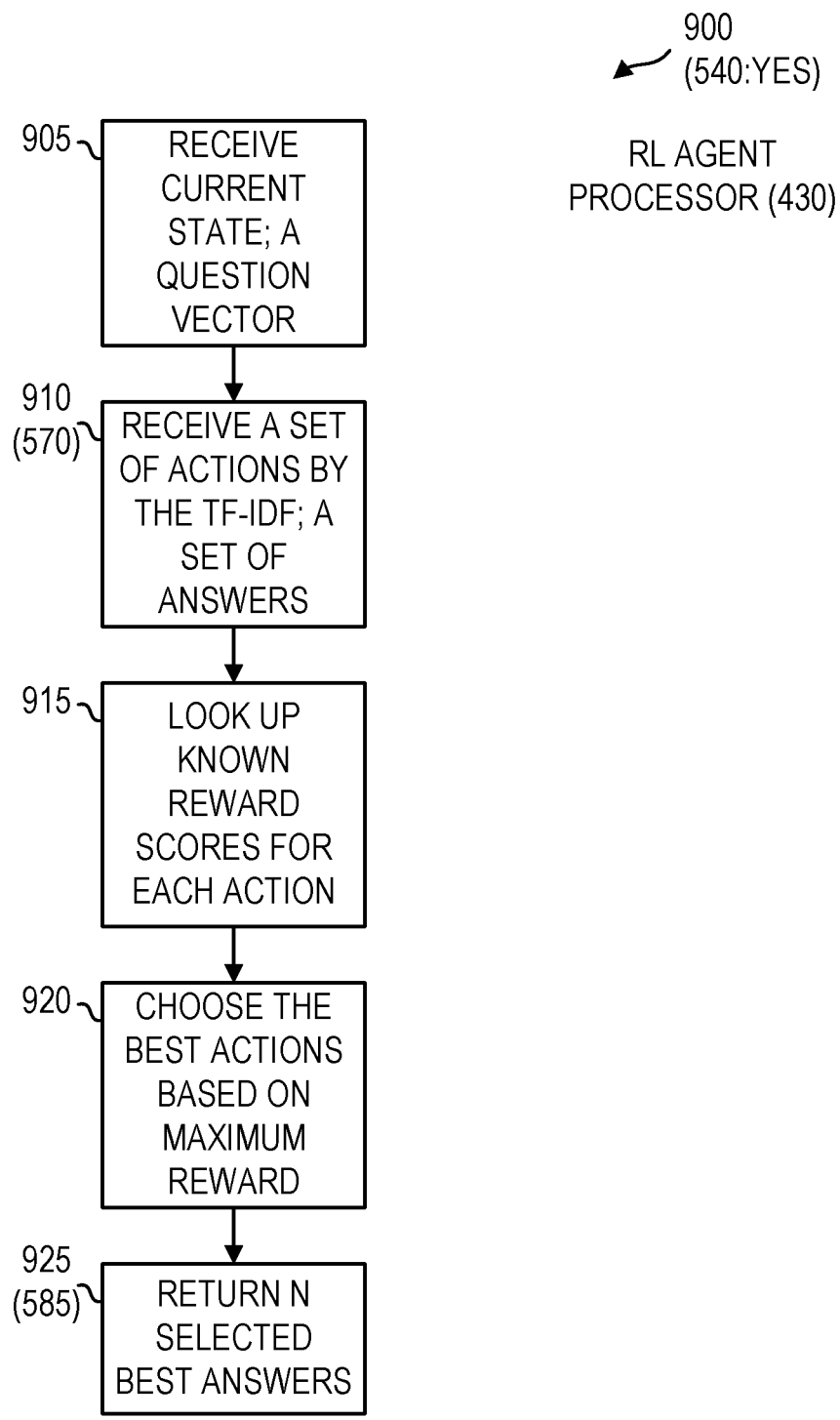
FIG. 9 is a flowchart of a process for operating a reinforcement learning agent, according to some embodiments.
Figure 10:
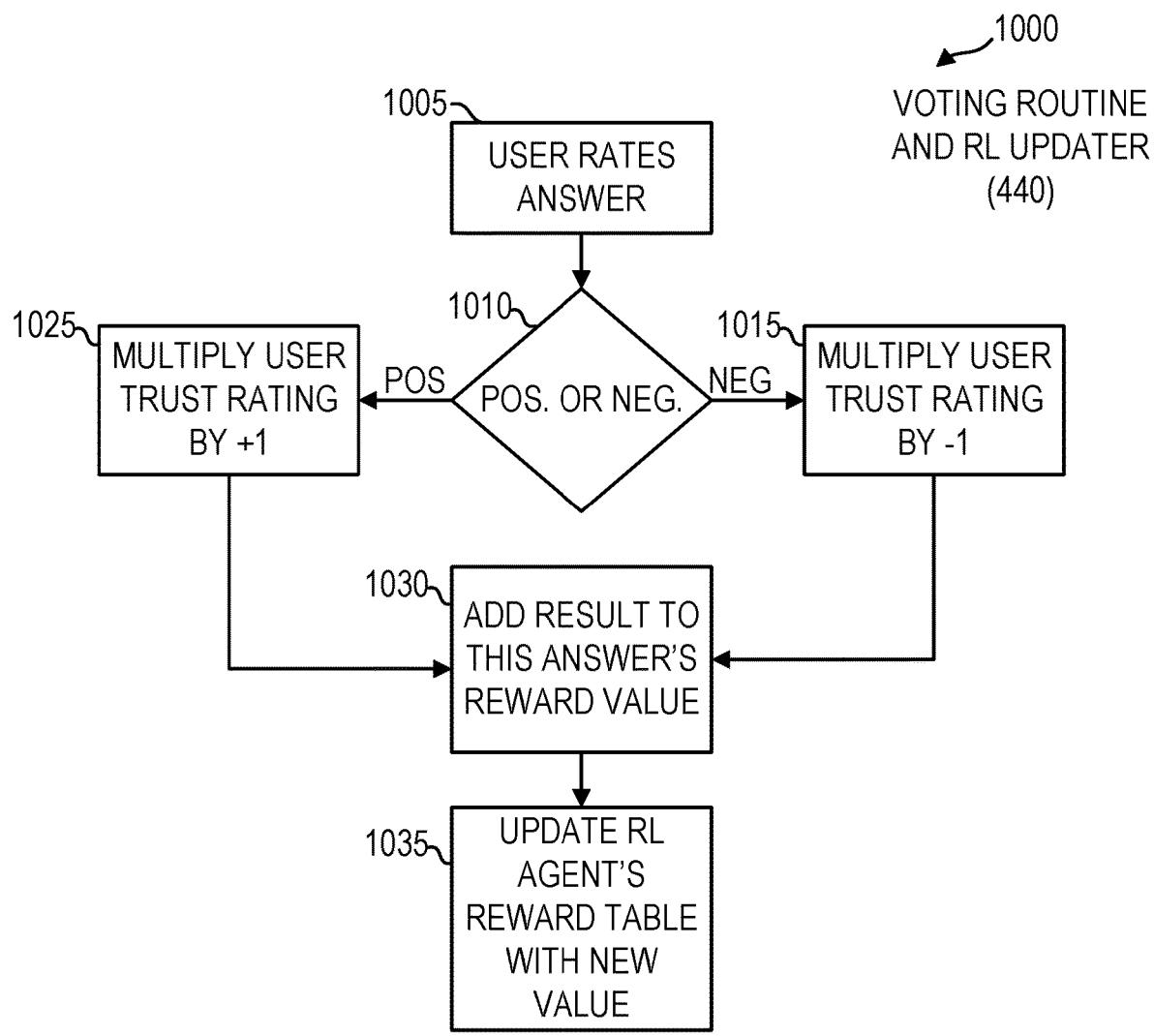
FIG. 10 is a flowchart of a process for receiving user ratings and updating a reward table, according to some embodiments.

FIG. 9 is a flowchart of a reinforcement learning (RL) agent process 900 (540:YES, 750), according to some embodiments, of the operation of the RL agent 430, once the message has been classified as a question. In operation 905, the RL agent 430 receives the vector of integers representing the question string (message) as previously passed to the RNN agent 415, and uses this vector as the current (question) state. The state is a representation of the current question being posed. In general, such a state might be the representation of the current state of the world or environment around the agent allowing the agent to take an action based on the current state. In the present case, the vector of integers representing the words in the question may be used as the state presented to the agent to make a decision. The current question vector may be passed to a recent questions database 460 containing recent questions (e.g., in a form of integer vectors) that may be used to determine if a statement previously determined in operation 745, is an answer to the current question or another question.

The TF-IDF process 800 is performed on the answers database 465 (operation 570), and, in operation 910, to find the closest matching answer. A set of actions (here, the set of answers) is received from the TF-IDF process 800 that the RL agent 430 may choose from.

In operation 915, using the rewards table 467 for this question state, the RL agent 430 may look up the previous reward scores (related to the user ratings) from the reward table 467 for each available action (available answers that have been returned by the TF-IDF system), and choose 920 the actions that maximize its reward. Where initially each newly discovered state (the state is the question/vector of integers representing the words in the question, and a newly discovered state is a state/question which has not yet been seen by the RL agent) will start off with a reward score of 0 for all available actions. After a user 200 provides positive or negative feedback to a posted answer provided by the ICCP (see FIG. 10, process 1000 below), the RL agent 430 adds a positive or negative value to the reward value of that action related to that state/question).

In operation 925, the RL agent 430 may return a final list of the best answers according to reward scores to the chat bot 310. The chat bot 310 may then utilize the chat's API to post this final list of the best answers to the chat channel, and then monitor for positive or negative feedback (e.g., a thumbs up or thumbs down, star rating system, or other form of rating, for each answer posted), and rewards or penalizes the answers' reward values 467 accordingly, as described in FIG. 10, process 1000.

In some embodiments, a number of stored or searched questions may be limited in some manner to prevent large storage requirements. This limitation may involve filtering by, e.g., recency, rating, etc.

Updating the RL Agent

FIG. 10 is a flowchart of a process 1000, according to some embodiments, for collecting user 200 feedback that may be used to increase or decrease the weight-values of an answer. These weight-values are presented to the RL agent 430, which is then used to determine the overall score of the answer. In operation 1005, the user 200 may rate an answer provided by the chat application 300 in order to provide feedback. This rating may be done by use of a scale, such as zero to five, where the user 200 enters a particular rating on this scale. For example, the scale may be presented to the user 200 in the form of stars, and the rating number may be selected by the user 200 by selecting the number of stars corresponding to the user's 200 rating. Any form of providing a rating by the user may be utilized. In operation 1010, the system may determine whether the rating is a positive or a negative rating. For example, if the scale is zero to five, then a rating of two or less may be considered negative, and a rating of three or more may be considered positive.

In some embodiments, if the rating is negative (1010:N), then in operation 1015, a user trust rating for a particular answer may be multiplied by negative one. If the rating is positive (1010:P), the user trust rating is multiplied 1025 by positive one. For example, if a user has a trust rating of thirty and rates positively, a value of thirty is added to the reward value of that answer related to the state/question in the RL agent's rewards table so that the next time this question is asked in the same or similar context, the RL agent is more likely to choose that answer. Conversely, given negative feedback, a value of thirty is subtracted from the reward value, so the RL agent is less likely to choose the answer given the same question in the same or similar context.

The above embodiment is just one way in which a user's rating may be input into the system, and numerous other ways are contemplated by the invention. In operation 1030, the result may be added to this answer's reward value, and in operation 1035, the RL agent's reward table may be updated with the new value.

Technical Application

The one or more embodiments disclosed herein accordingly provide an improvement to computer technology. For example, an improvement to a chat application allows for more efficient and effective computer communication by users. The ability to provide users with relevant information that is already present in the chat database, the application may substantially improve the efficiency of the chat application.

Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing chat channel communications in a chat application, the method comprising using a processor for:
   receiving a user message from a user;
   classifying the user message using a classifier into a classified input that is one of a question, an answer, and a statement;
   responsive to the classified input being a question:
      determining a set of relevant answers from an answer database that are related to the question;
      determining a relatedness score reflecting a degree of relatedness between each related answer of the set of related answers and the question;
      determining a top answer from the set of related answers based on the relatedness scores; and
      presenting at least one of the top answer and the set of related answers to the user;
   responsive to the classified input being an answer:
      storing the answer in the answer database;
   responsive to the classified input being a statement:
      discarding the classified input;
   receiving a feedback user message that rates the top answer; and
   modifying a reward score for the top answer based on the feedback user message to adjust a future top answer response.

2. The method of claim 1, wherein the classifying of the user message as an answer further comprises:
   determining that the user message is not a question;
   determining a set of relevant questions from a recent question database comprising previous recently asked questions;
   performing a term frequency-inverse document frequency (TF-IDF) procedure of the user message against questions in the recent questions database to obtain relevance scores for each of the questions; and
   responsive to at least one of the relevance scores exceeding a predefined question relevance threshold, classifying the user message as an answer.

3. The method of claim 2, wherein both the determining of the set of relevant questions and the set of relevant answers utilizes a term frequency-inverse document frequency (TF-IDF) procedure.

4. The method of claim 1, wherein the classifier uses a recursive neural network (RNN) agent.

5. The method of claim 1, wherein the determining of the top answer utilizes a reinforcement learning (RL) agent.

6. The method of claim 1, wherein the user message is received as a text string, the method further comprising processing the text string to produce a tokenized message vector that represents the user message.

7. The method of claim 6, wherein:
   the tokenized message vector comprises word integers that are integers representing words of the user message; and
   each word integer has an associated weight.

8. The method of claim 7, wherein the classifier is a recursive neural network (RNN), the method further comprising:
   determining, by the RNN, an activation for each word integer that is forward propagated in the RNN; and
   applying results of the activation to a sigmoid activation function to produce a vector index;
   wherein the determining of the user message as a question is based on a value associated with the vector index.

9. The method of claim 1, further comprising storing the question in the recent questions database.

10. The method of claim 1 wherein the answer database and the recent questions database are all related to a common chat channel of the chat application.

11. The method of claim 1, wherein the determining of the top answer uses a previously modified relevance score.

12. The method of claim 1, wherein the reward score is modified by a user trust rating.

13. A chat channel processing system, comprising:
   a processor configured to:
      receive a user message from a user;
      classify the user message using a classifier into a classified input that is one of a question, an answer, and a statement;
      responsive to the classified input being a question:
         determine a set of relevant answers from an answer database that are related to the question;
         determine a relatedness score reflecting a degree of relatedness between each related answer of the set of related answers and the question;
         determine a top answer from the set of related answers based on the relatedness scores; and
         present at least one of the top answer and the set of related answers to the user;
      responsive to the classified input being an answer:
         store the answer in the answer database;
      responsive to the classified input being a statement:
         discard the classified input;
      receive a feedback user message that rates the top answer; and
      modify a reward score for the top answer based on the feedback user message to adjust a future top answer response.

14. The system of claim 13, wherein the classification of the user message as an answer further causes the processor to:
   determine that the user message is not a question;
   determine a set of relevant questions from a recent question database comprising previous recently asked questions;
   perform a term frequency-inverse document frequency (TF-IDF) procedure of the user message against questions in the recent questions database to obtain relevance scores for each of the questions; and responsive to at least one of the relevance scores exceeding a predefined question relevance threshold, classify the user message as an answer.

15. The system of claim 14, wherein both the determining of the set of relevant questions and the set of relevant answers utilizes a term frequency-inverse document frequency (TF-IDF) procedure.

16. The system of claim 13, wherein the classifier uses a recursive neural network (RNN) agent.

17. The system of claim 13, wherein the determining of the top answer utilizes a reinforcement learning (RL) agent.

18. The system of claim 13, wherein:
the user message is received as a text string, the method further comprising processing the text string to produce a tokenized message vector that represents the user message;
the tokenized message vector comprises word integers that are integers representing words of the user message;
each word integer has an associated weight;
the classifier is a recursive neural network (RNN),
the system further causing the processor to:
determine, by the RNN, an activation for each word integer that is forward propagated in the RNN; and
apply results of the activation to a sigmoid activation function to produce a vector index;
wherein the determination of the user message as a question is based on a value associated with the vector index.

19. A computer program product for a chat channel processing system, the computer program product comprising a computer readable storage medium having computer-readable program code embodied therewith to, when executed on a processor:
receive a user message from a user;
classify the user message using a classifier into a classified input that is one of a question, an answer, and a statement;
responsive to the classified input being a question:
determine a set of relevant answers from an answer database that are related to the question;
determine a relatedness score reflecting a degree of relatedness between each related answer of the set of related answers and the question;
determine a top answer from the set of related answers based on the relatedness scores; and
present at least one of the top answer and the set of related answers to the user;
responsive to the classified input being an answer:
store the answer in the answer database;
responsive to the classified input being a statement:
discard the classified input;
receive a feedback user message that rates the top answer; and
modify a reward score for the top answer based on the feedback user message to adjust a future top answer response.

20. The computer program product of claim 19, wherein the instructions further cause the processor to:
determine that the user message is not a question;
determine a set of relevant questions from a recent question database comprising previous recently asked questions;
perform a term frequency-inverse document frequency (TF-IDF) procedure of the user message against questions in the recent questions database to obtain relevance scores for each of the questions; and
responsive to at least one of the relevance scores exceeding a predefined question relevance threshold, classify the user message as an answer.

* * * * *